Sept. 18, 1928.  W. A. GEIGER  1,684,537
CAR CONSTRUCTION
Filed July 18, 1927
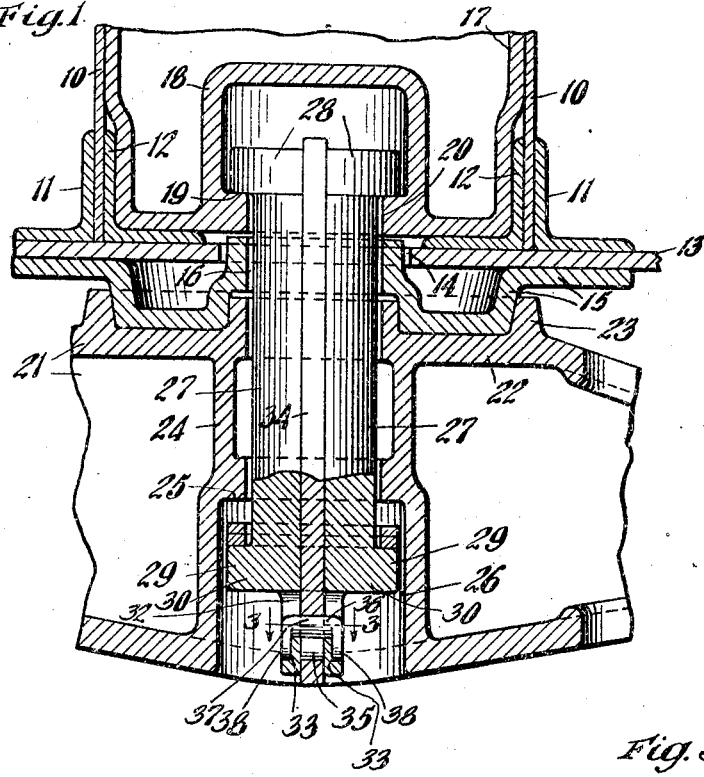
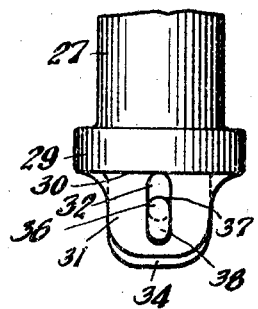
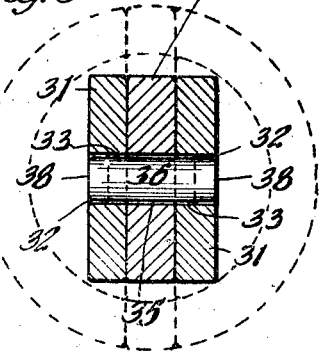
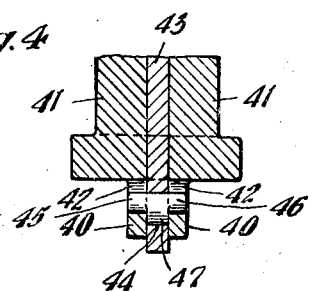
Inventor
William A. Geiger
By George J. Haight
Atty.

Patented Sept. 18, 1928.

1,684,537

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

CAR CONSTRUCTION.

Application filed July 18, 1927. Serial No. 206,549.

This invention relates to improvements in car construction.

In the operation of railroads it has been found advisable to lock the under-framing and trucks of the car together so as to minimize or prevent overturning or telescoping of the cars in event of collision or derailment, and certain types of split locking pins have been utilized for securing the trucks against vertical separation with reference to the underframing of the car. In certain types of railway equipment the car construction is of such character as to prevent insertion of the locking king pins from the top of the under-framing, and the same must be inserted from below the truck bolster.

An object of the present invention is to provide car construction in which the under-framing and truck bolster are so arranged as to accommodate a locking king pin inserted from beneath the truck bolster, in conjunction with a locking pin of the split type including flanged sections and a spreader, which latter elements are provided with detachable means for maintaining the spreader between the flanged sections in such position as to lock the under-framing and truck bolster together, and wherein the detachable means is accessible from beneath the truck bolster to permit the ready application and removal of said pin.

A more particular object of the invention is to provide a construction of the character referred to, wherein the flanged sections of the locking pin, and the spreader, are held in operative position through the medium of detachable fastening elements which have abutments adapted to engage portions of the flanged sections forming part of the pin, whereby said sections are prevented from spreading apart, and the fastening elements are held against movement in a direction to accidently detach the same, the construction being such that the weight of the spreader is imposed upon the fastening elements and serves to maintain the abutments of the fastening elements and the flanged sections in operative position.

Other and further objects of the invention will more clearly appear from the description and claims hereinafter following.

In the drawings forming part of this specification, Figure 1 is a fragmentary transverse sectional view through the center sills, filler casting, spring plank, body bolster, and truck bolster, showing my invention in connection therewith. Figure 2 is a side elevational view of the lower portion of the locking pin showing the fastening means in position thereon. Figure 3 is a horizontal sectional view through the lower end of the pin, corresponding substantially to the line 3—3 of Figure 1. And Figure 4 is a fragmentary vertical sectional view of the lower end of the pin, corresponding to the view of the lower end of the pin shown in Figure 1, and illustrating a slightly different embodiment of the invention.

In the drawings, portions of the center sills of the car are shown, each of the same comprising a vertically disposed plate 10, having angle members 11—11 secured to the lower outer edges thereof, and having oppositely disposed angle members 12—12 secured to the lower inner edges thereof. A body bolster is provided, comprising the usual top and bottom cover plates, the lower of which is indicated at 13, said plate having a central opening 14 adapted for the reception of the upper annular flange of the center plate 15 which is secured to the under-surface of the plate 13. The center plate is provided with an opening 16 for the passage of the king pin hereinafter described. Disposed between the center sill plates 10—10 is a filler casting indicated at 17, said filler casting being provided with a center pin section 18 which has cylindrical walls closed at the top, and an annular off-set adjacent the bottom providing a shoulder 19 which surrounds an opening 20 through which the king pin is adapted to pass.

The truck bolster is indicated at 21, and for the most part is of the usual hollow cast steel construction including a top wall 22 provided with a center plate section 23 adapted to accommodate the annular rib on the center plate 15 secured to the body bolster cover plate. Said bolster also includes a central pin section 24 having an opening therethrough for the passage of the king pin, and being off-set adjacent its bottom to provide an annular shoulder 25, the lower portion of the central section 24 defining a somewhat enlarged chamber 26 opening outwardly beneath the truck bolster. A fragment of the spring plank of the truck is indicated at 126, said plank being provided with an opening 127 through which the locking pin hereinafter described may be inserted when said pin is being inserted into operative position. The locking pin is of a sectional two-piece split type and comprises two side members 27—27, each of which is of approximately semi-circular cross section, and each member is provided with laterally extending flanges 28—28 at the top ends, and flanges 29—29 at the bottom ends, the flanges 28—28 being adapted to fit over the annular shoulder 19 in the center section 18 of the filler casting, while the flanges 29 are adapted to engage the annular shoulder 25 in the center section 24 of the bolster 21 in certain position of the parts. The ends 30—30 of the sections 27—27 are each provided with an ear 31, and each ear has a longitudinally extending slot 32 formed therein, the lower end of the slot merging with an off-set 33, the ears 31 being alike except for their opposite disposition. Co-operating with the sections 27—27 of the pin is a spreader 34, the latter being in the form of a flat bar adapted to be inserted between the sections 27—27 to spread them apart after they are inserted upwardly through the center pin sections so that the flanges 28—28 inter-engage with the annular shoulder 19 of the section 18, while the flanges 29—29 are disposed in line with the annular shoulder 25 to prevent separation of the two center sections of the body bolster or under-framing of the car and the truck bolster respectively. The lower end of the spreader 34 is provided with a longitudinally extending slot 35 adapted to register with the slots 32 in the ears 31 in certain positions of the parts. This spreader 34 is supported from its lower ends by means of a fastening member 36. Said fastening member comprises a cylindrical central section 37, and spaced angularly disposed arms 38—38, said fastening member 37 being insertable from one side of the ears 31, through the slots 32 of said ears, and the slot 35 of the spreader when said slots are in register, the fastener being moved downwardly to engage the arms 38—38 in the off-sets 33 of said ears, and being held in position by the weight of the spreader 34, and at the same time supporting the spreader 34 against dropping out from its spreading position between the pin sections 27—27. Due to the arrangement of the off-sets 33, the outer surfaces of the fastening element are disposed flush with the outer surfaces of the ears 31, and said fastening member effectually maintains the sections 27 against spreading movement which might serve to disconnect the same.

In the use of the invention, when it is desired to remove the locking pin access may be gained to the fastening member 36, the spreader slightly elevated so as to permit disconnection of the arms 38—38 with the ears 31, after which the fastening member may be removed laterally with reference to the locking pin, and the spreader dropped downwardly permitting the sections 27—27 to be moved together so as to disengage the flanges 28 from the shoulder 19, after which said sections may be removed, the spring plank being provided with the opening 127 to permit ready removal of the parts. In applying the pin the sections 27 are placed together and inserted into the bearing openings from underneath the bolster until the flanges are in position to engage the shoulder 19, after which the spreader is inserted, with the slot 35 registering with the slots 32 of the ears 31, the fastening member 36 being then inserted and the spreader released to impose its weight upon the fastening member which maintains the arms thereof in interlocking engagement with the off-sets 33.

Referring to Figure 4, the ears 40—40 of the pin sections 41—41 are similar in form to the ears 31 above described, except the slots 42—42 in said ears are of plain elongated form with no off-set corresponding to the off-set 33 heretofore described. The spreader 43 is provided with an elongated slot 44 adapted for the reception of the fastening member 45. The fastening member 45 comprises a cylindrical body portion 46, the ends of which are disposed in the slots 42—42, while the cylindrical portion intermediate its ends extends through the slot 44 in the spreader 43 and is provided with a laterally disposed projection 47 which fits in the slot 44, and which is disposed between the ears 40—40, where it is held in position under the weight of the spreader 43 bearing thereon, accidental detachment of said fastening member laterally of the ears 40—40 being thus prevented.

The operation of the construction just described is essentially similar to that referred to in the construction shown in Figures 1 to 3 inclusive, the fastening member being held in position under the influence of the weight imposed thereon by the spreader, and being removable when the spreader is elevated and the lateral extension 47 is lifted from its position between the lower ends of the ears 40—40. In applying the fastening member, the slots in the ears 40—40 and spreader 43 are lined up, the fastening member inserted and the lateral projection dropped between the ears 40—40 where it is held by the spreader, thereby effectually preventing accidental detachment of the fastening member, but permitting the same to be readily detached when it is desired to withdraw the pin from its locking position.

While I have herein shown and described what I consider the preferred manner of carrying out the invention, the same is merely illustrative and I contemplate all changes and modifications which come within the scope of the claims appended hereto.

I claim—

1. In a structure of the character described, the combination with the under-framing of a car, and a truck bolster, said under-framing and truck bolster providing king pin openings and oppositely disposed bearing shoulders; of a locking pin insertable from beneath the truck bolster and including flanged sections adapted to be disposed in line with said bearing shoulders when in position, each of said sections being provided at its lower end with an extension; a spreader disposed between said sections for maintaining the flanges of the latter in line with the bearing shoulders of said under-framing and truck bolster, said spreader being provided with an opening adjacent its lower end; and a fastening device having abutments thereon adapted in one position to engage with abuments on the extensions of said sections and in a different position, being detachable with reference to said extension abutments, said fastening device extending through the opening in said spreader and being held thereby in position to prevent disengagement of said abutments.

2. In a structure of the character described, the combination with the under-framing of a car including a filler casting, and a truck bolster, said filler casting being provided with a king pin section closed at the top and having an annular bearing shoulder, and said truck bolster being provided with a king pin section having an annular bearing shoulder; and a locking pin comprising separate sections having flanges at opposite ends adapted to be disposed in line with said annular bearing shoulders, said sections being insertable from beneath the truck bolster, and provided on the lower ends with abutments; a spreader adapted to be disposed between said sections, said spreader being insertable from beneath said truck bolster; a fastening member having abutments thereon adapted in one position to inter-engage with the abutments upon the lower ends of said sections and in a different position being detachable therefrom, said fastening member extending through an opening in the lower end of said spreader and held in position by the weight of said spreader to maintain the abutments upon said fastening element and said sections in operative position.

3. A locking pin of the character described, comprising flanged sections, having means providing abutments at one pair of ends; a spreader disposed between said sections; and a fastening member having abutments detachably engageable with the abutments on said sections, said fastening member extending through an opening in said spreader, and adapted to be held in engagement by the weight of said spreader when said pin is in position.

4. A locking pin of the character described, comprising flanged sections, each of which has a slotted extension at one end; a spreader disposed between said sections and provided with a slot; a fastening member extending through the slots and said extensions and said spreader, said fastening member being shouldered to inter-engage with said extensions to prevent detachment thereof, said fastening member being held in position by the imposition of the weight of the spreader thereon when said locking pin is in position.

5. A locking pin of the character described, comprising flanged sections and a spreader, said sections and said spreader being provided with openings, and said sections having means thereon providing abutments; a fastening device extending through the openings in said sections and spreader and having means inter-engageable with the abutments on said sections in one position, and being detachable from engagement with said abutments in a different position, said fastening device being held in position by such spreader to cause inter-engagement of said abutments when said locking pin is used.

6. A locking pin of the character described, comprising flanged sections each having a longitudinally disposed ear at one end, said ears being longitudinally slotted; a spreader disposed between said sections and provided with a longitudinally extended slot; a fastening member having a central section and spaced angularly disposed arms, said fastening member being insertable through the openings in said ears and spreader and movable to position to cause engagement of said arms with said ears, said fastening member being held in operative position under the influence of the weight exerted thereon by said spreader when said pin is in use.

7. As an article of manufacture, a fastening device for the split sections and spreader of a locking pin, said device comprising an elongated body portion having portions adapted to bear upon said sections and a portion for supporting said spreader, and having abutment means extending at an angle to said body portion and adapted to inter-engage with portions of said sections.

In witness that I claim the foregoing I have hereunto subscribed my name this 11th day of July, 1927.

WILLIAM A. GEIGER.